United States Patent [19]
Dziewulski

[11] 3,981,099
[45] Sept. 21, 1976

[54] HANGING POT WITH DETACHABLE TRAY

[75] Inventor: Ted Dziewulski, Bartlett, Ill.

[73] Assignee: Phillips Petroleum Company, Bartlesville, Okla.

[22] Filed: May 14, 1975

[21] Appl. No.: 577,493

[52] U.S. Cl. .................................. 47/35; 47/34 R; 220/69; 47/38
[51] Int. Cl.² ......................................... A01G 9/02
[58] Field of Search ................................. 47/34–36, 47/38; 220/69, 68, 307; 248/346; 217/36 R

[56] References Cited
UNITED STATES PATENTS

| | | | |
|---|---|---|---|
| 1,678,988 | 7/1928 | Maier | 47/34 |
| 1,896,229 | 2/1933 | Ellis | 47/34.2 |
| 2,504,031 | 4/1950 | Manning | 47/34.2 |
| 2,550,989 | 5/1951 | French et al. | 47/34.4 |
| 2,605,588 | 8/1952 | Lindstaedt | 47/35 X |
| 2,818,681 | 1/1958 | Coplen | 47/34 R |
| 2,910,219 | 10/1958 | Bennett et al. | 248/346 X |
| 2,929,601 | 3/1960 | Anderson | 248/346 |
| 3,079,037 | 2/1963 | Schechter | 220/69 X |
| 3,631,627 | 1/1972 | Van Zijverden | 47/34 R |
| 3,785,088 | 1/1974 | Guarriello | 47/34 |
| 3,867,788 | 2/1975 | Mickelson | 47/35 |

FOREIGN PATENTS OR APPLICATIONS

| | | | |
|---|---|---|---|
| 289,885 | 10/1965 | Austria | 47/34.2 |
| 176,704 | 3/1953 | Germany | 47/34.5 |
| 196,167 | 7/1957 | Germany | 47/34.5 |
| 136,434 | 12/1919 | United Kingdom | 47/34.3 |

Primary Examiner—Edgar S. Burr
Assistant Examiner—James R. Feyrer

[57] ABSTRACT

A hanging pot is provided with openings adjacent to but spaced from the bottom wall thereof to receive the hook members of a detachable tray for locking the tray to the pot. The hook members are supported on pillars spaced inwardly from the tray wall.

21 Claims, 10 Drawing Figures

HANGING POT WITH DETACHABLE TRAY

This invention relates to a hanging pot having a detachable tray. In one aspect the invention relates to a flower pot which is adapted to be suspended in a hanging position and which is provided with a detachable watering tray.

Numerous designs for watering saucers for flower pots have been devised where the flower pot sits on the saucer and the saucer rests on a support surface such as a table. However, when the pot is to be suspended in a hanging position, the watering saucer is usually omitted because of the difficulties in supporting the watering saucer. However, it is frequently desirable that a hanging flower pot be provided with a watering saucer.

Accordingly it is an object of the present invention to provide a new and improved hanging pot. Another object of the invention is to provide a hanging flower pot with a detachable watering saucer. Another object of the invention is to provide a hanging pot and an attachable saucer which are simple in construction and economical to manufacture. Other objects, aspects and advantages of the invention will be apparent from a study of the specification, the drawings and the appended claims to the invention.

In the drawings

Figure 1:
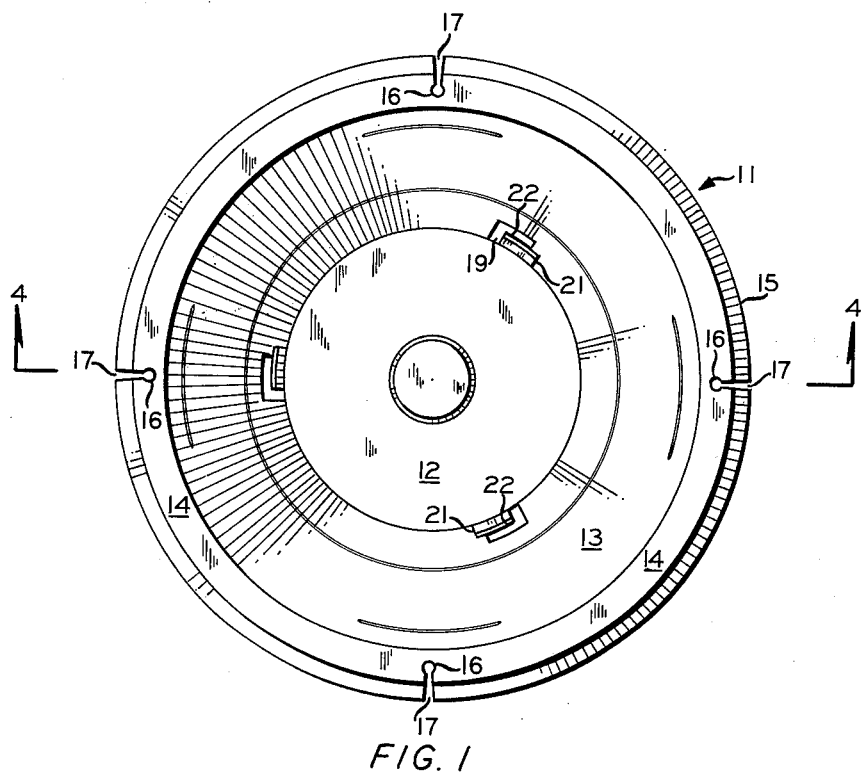
FIG. 1 is a top plan view of a pot in accordance with a presently preferred embodiment.
Figure 2:
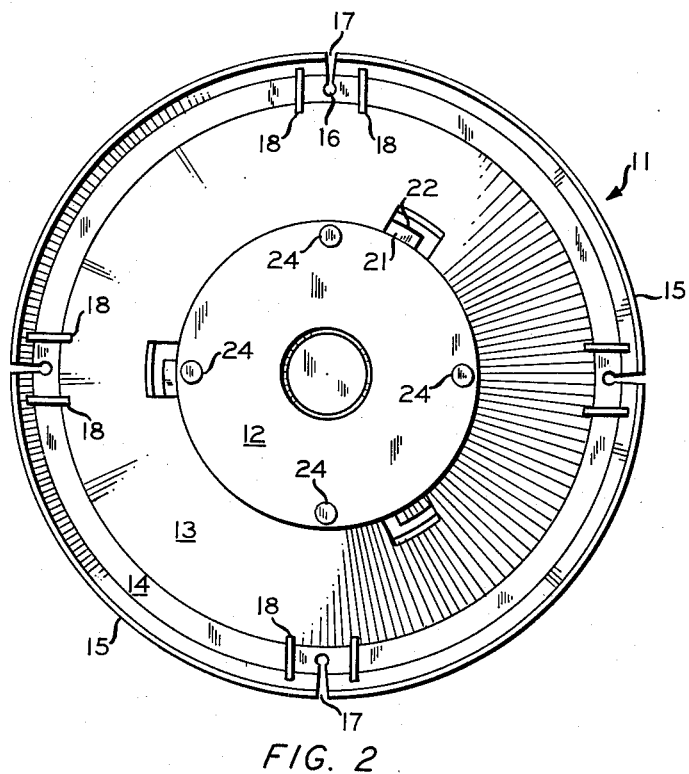
FIG. 2 is a bottom plan view of the pot of FIG. 1.
Figure 3:
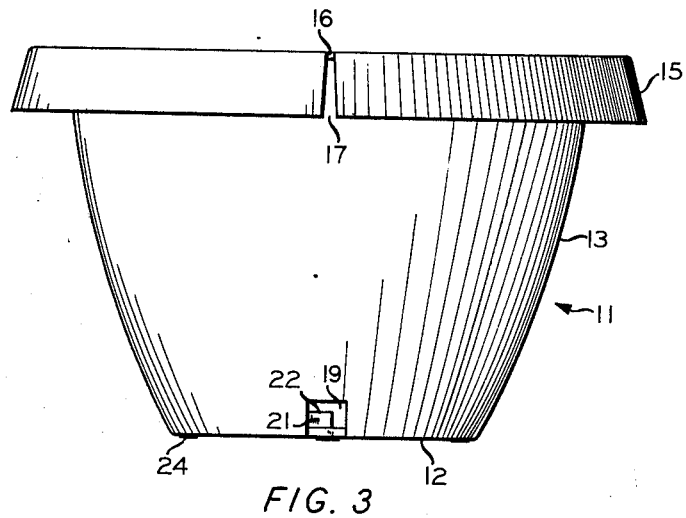
FIG. 3 is the left side elevational view of the pot of FIG. 1.
Figure 4:
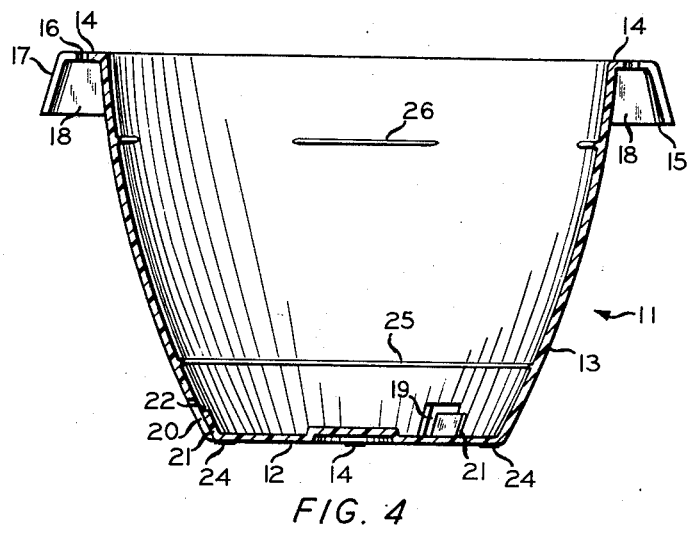
FIG. 4 is an elevational view in cross section taken along line 4—4 of FIG. 1.
Figure 5:
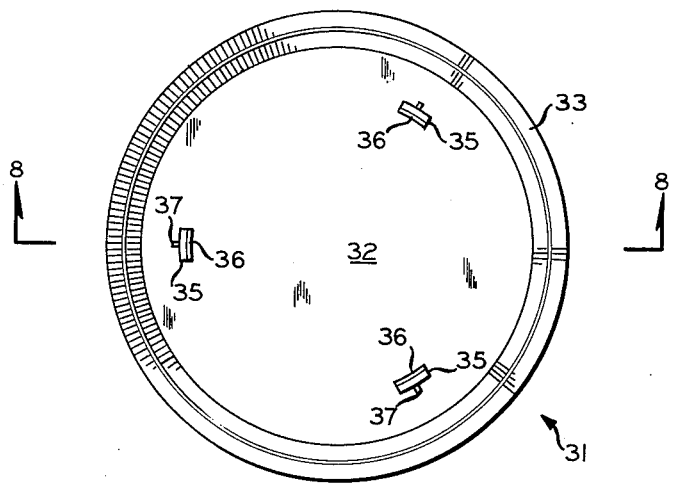
FIG. 5 is a top plan view of a detachable tray in accordance with said presently preferred embodiment.
Figure 6:
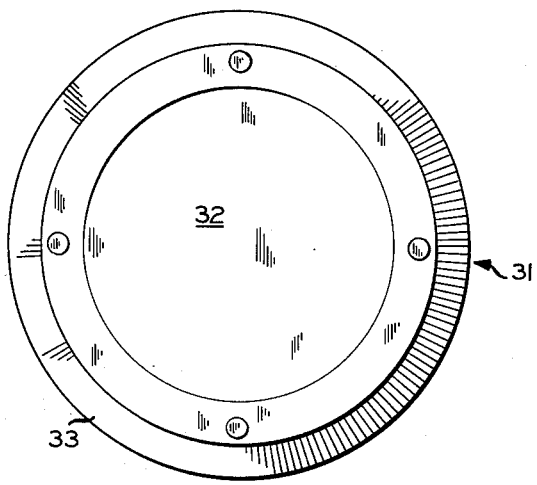
FIG. 6 is a bottom plan view of the tray of FIG. 5.
Figure 7:
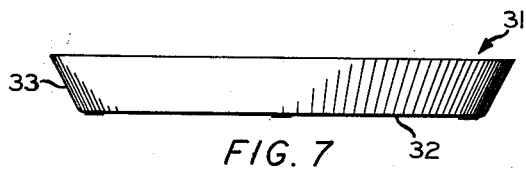
FIG. 7 is a side elevational view of the tray of FIG. 5.
Figure 8:
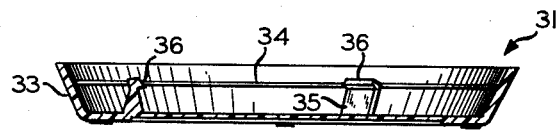
FIG. 8 is an elevational view in cross section taken along the line 8—8 of FIG. 5.

Referring now to FIGS. 1 through 4, the pot 11 has a bottom wall 12 and a sidewall 13 extending generally upwardly and outwardly from the periphery of the bottom wall 12. The upper or rim portion of pot 11 is formed in the configuration of an inverted U, and comprises an annular flange 14 extending outwardly in a generally horizontal direction from the upper extent of the main portion of sidewall 13 and a skirt 15 extending outwardly and downwardly from the outer periphery of flange 14. Holes 16 are evenly spaced about the circumference of flange 14 and slots 17 extend from the lower edge of skirt 15 to the respective holes 16 to provide for the insertion of a knotted cord or other suitable means through the slots 17 into the holes 16 to suspend the pot in a hanging position. A pair of reinforcing braces 18 extend from wall 13 to skirt 15 and flange 14 on opposite sides of each hole 16 and slot 17 to provide the desired structural rigidity and strength.

A plurality of openings 19 are formed in sidewall 13 by slots 20 in cooperation with pilasters 21. Each slot 20 extends from the upper extent of the respective opening 19 downwardly through bottom wall 12, with a depth equal to the thickness of sidewall 13. This configuration of slots 20 is particularly advantageous in the production of the pot by injection molding as it permits the formation of openings 19 through sidewall 13 without the necessity of utilizing separately movable plugs. Each pilaster 21 is joined to the inner surface of sidewall 13 and extends horizontally across at least a substantial portion of the respective slot 20. In the illustrated embodiment each pilaster 21 extends horizontally across at least half and less than the full width of the respective slot 20 so that each opening 19 is generally in the shape of an inverted L. The portion of the opening 19 between the free vertical edge of pilaster 21 and the adjacent vertical edge of slot 20 serves as a drain opening through which water can pass from the interior of pot 11 outwardly into tray 31 or from the reservoir in tray 31 inwardly into the interior of pot 11. Each pilaster 21 extends upwardly from bottom wall 12 to a height less than the upper extent of the respective opening 19. At least a substantial portion of the bottom edge of each of the openings 19 is defined by a respective generally horizontal shoulder 22 spaced upwardly from the bottom wall 12 by a first distance. In the illustrated embodiment, these shoulders 22 are the top generally planar surfaces of the pilasters 21.

The lower surface of bottom wall 12 can be provided with a plurality of spacer feet 24, located about the peripheral margin of bottom wall 12. A rib 25 can be provided on the interior surface of sidewall 13 at a first level to provide a desired reference marking, for example the level of gravel or sand to be placed in the bottom of pot 11. A second rib 26 can be provided on the interior surface of sidewall 13 at a second, higher level to provide a second reference mark, for example the level of soil to be employed in the pot 11. Each of ribs 25 and 26 can be continuous or segmented as desired.

Figure 9:
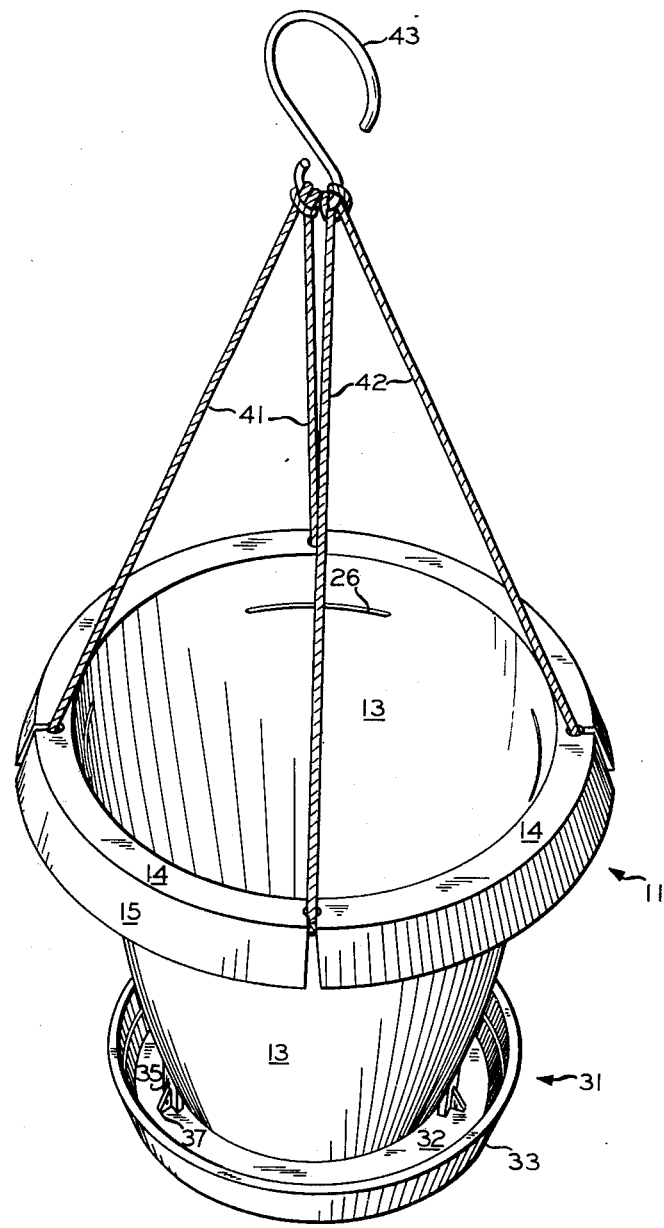
FIG. 9 is a perspective view of the pot of FIG. 1 with the tray of FIG. 5 attached thereto.
Figure 10:
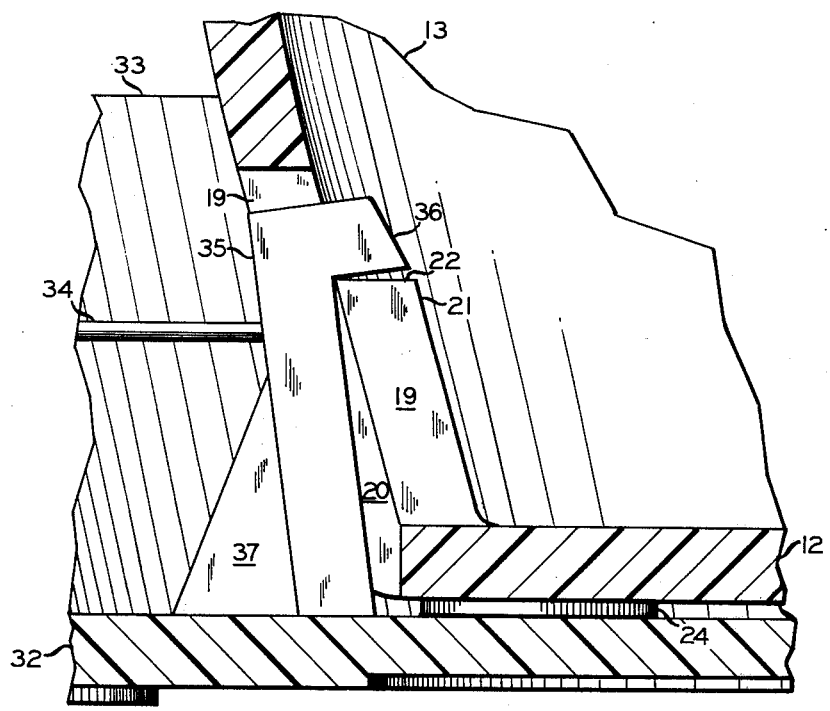
FIG. 10 is an enlarged, partial elevational view in cross section showing the attachment of the tray to the pot.

Referring now to FIGS. 5 to 8, the detachable tray 31 has a generally horizontal solid base wall 32 and a retaining wall 33 extending generally upwardly and outwardly from the periphery of base wall 32 throughout the extent of the periphery of base wall 32 to thereby form a receptacle capable of containing a liquid. A rib 34 can be provided on the interior surface of retaining wall 33 to provide a desired reference, for example the height of water to be introduced into tray 31. A plurality of pillars 35 extend generally upwardly from base wall 32 at locations spaced from the periphery of base wall 32 and spaced from each other in a pattern corresponding to the pattern of the locations of the openings 19 in the sidewall 13 of pot 11. The transverse dimensions of base wall 32 are substantially greater than the corresponding transverse dimensions of bottom wall 12 of pot 11 so that upon attachment of tray 31 to pot 11, as shown in FIG. 9, there is a substantial distance between sidewall 13 and retaining wall 33, thereby providing an adequate water reservoir as well as ample room for the introduction of water into the reservoir by suitable means, for example by using a watering can having a large spout. Each of pillars 35 has a hook member 36 formed thereon extending generally horizontally from the upper extent of the respective pillar toward the central vertical axis of the tray 31. The lower surface of each of the hook members 36 is spaced a second distance above the top surface of base 32, the second distance being at least as great as the first distance by which shoulder 22 of each pilaster 21 extends above the lowermost part of bottom wall 12 of pot 11. The vertical thickness of the hook members 36 is less than the height of the opening 19 above shoulder 22. The width of each hook member 36 is greater than the distance between the free edge, if any, of pilaster 21 and the adjacent vertical edge of slot 19, but less than the total width of slot 19. Thus, upon positioning the pot 11 on the base wall 32 of tray 31 coaxially with tray 31, the hook members 36 enter the openings 19 in the sidewall 13 of pot 11 and engage the top shoulders 22 of pilasters 21 to thereby lock the pot 11 and tray 31 together, as shown in FIGS. 9 and 10. It is presently preferred that each pillar 35 is provided with a bracing portion 37 extending upwardly and inwardly from the base wall 32 to an upper portion of the respective pillar so that each pillar 35 is relatively rigid with respect to the contiguous portion of base wall 32. Spacer feet 24 separate the central portion of bottom wall 13 from the central portion of base wall 32 to make it easier to flex at least a portion of the central portion of base wall 32 upwardly sufficiently to cant at least one of the pillars 35 outwardly, thereby withdrawing the hook member 36 of the at least one pillar 35 from engagement with the respective shoulder 22 when it is desired to detach tray 31 from pot 11 for any purpose.

Referring now to FIG. 9, the ends of a pair of cords 41 and 42 having knots formed therein have been inserted through slots 17 to position the knots beneath flange 14. One end of an S hook 43 engages cords 41 and 42 at their mid portion, and the other end of hook 43 is adapted to be suspended on a suitable support means, for example a nail extending from a structural element, to support the pot 11 and attached tray 31 in a hanging position. The locking effect of hook members 36 on pillars 35 engaging shoulders 22 of pilasters 21 maintains the tray 31 attached to pot 11 even when the tray is full of water or other matter.

While the invention has been illustrated in terms of a pot 11 having a discoidal bottom wall 12 and a generally frustoconical sidewall 13 and a tray 31 having a discoidal base wall 32 and a generally frustoconical retaining wall 33, other configurations can be employed. Thus walls 13 and 33 can be generally vertical or inclined inwardly and upwardly instead of the illustrated upward and outward inclination, and walls 13 and 33 can have similar or dissimilar configurations. The horizontal cross section of pot 11 and tray 31 can be circular, as shown, or any other suitable configuration, for example oval, generally rectangular, generally polygonal, kidney shaped, etc. The pot 11 and the tray 31 can have similar or dissimilar horizontal cross sections. The walls 13 and 33 can be provided with any desired surface ornamentation. The pot 11 can be provided with any suitable rim structure as well as any suitable means secured to the upper portion of the pot sidewall 13 for supporting the pot and attached tray in a hanging position. Although it is presently preferred to employ three openings 19 and three corresponding pillars 35, four or more of each can be employed. It is also preferable to space the openings 19 uniformly about the circumference of wall 13, but uneven spacing can also be employed. In the presently preferred embodiment each of pot 11 and tray 31 is a single piece of thermoplastic material formed by injection molding. The lower surface of hook members 36 and the mating surfaces of shoulders 22 can be generally planar or curved in a desired configuration.

Reasonable variations and modifications are possible within the scope of the foregoing disclosure, the drawings and the appended claims to the invention.

That which is claimed is:

1. An article of manufacture comprising:

a pot having a bottom wall, a sidewall extending generally upwardly from the periphery of said bottom wall, and means secured to the upper portion of said sidewall for supporting said pot in a hanging position, said sidewall extending substantially continuously along the periphery of said bottom wall, said sidewall having a plurality of openings therein spaced horizontally from each other, at least a substantial portion of the bottom edge of each of said plurality of openings being defined by a respective generally horizontal shoulder spaced upwardly from said bottom wall top surface by a first distance, a detachable tray having a generally horizontal solid base wall and a retaining wall extending generally upwardly from the periphery of said base wall throughout the extent of the periphery of said base wall to thereby form a receptacle capable of containing a liquid, the transverse dimensions of said base wall being substantially greater than the corresponding transverse dimensions of said bottom wall of said pot, a plurality of pillars extending generally upwardly from said base wall at locations spaced from the periphery of said base wall, each of said pillars having a hook member extending generally horizontally from the upper extent of the respective pillar toward the central vertical axis of said tray, each of said hook members being spaced a second distance above said base wall, said second distance being at least as great as said first distance, said pillars being spaced from each other in a pattern corresponding to the pattern of the locations of said plurality of openings in said sidewall of said pot so that upon positioning of said pot on said base wall coaxially with said tray said hook members enter said plurality of openings in said sidewall of said pot and engage said shoulders to thereby lock together said pot and said tray.

2. An article of manufacture comprising:

a pot having a bottom wall and a sidewall extending generally upwardly from the periphery of said bottom wall, said sidewall extending substantially continuously along the periphery of said bottom wall, said sidewall having a plurality of openings therein spaced horizontally from each other, at least a substantial portion of the bottom edge of each of said plurality of openings being defined by a respective generally horizontal shoulder spaced upwardly from said bottom wall by a first distance; each of said plurality of openings in said sidewall being formed by a slot in said sidewall extending from the upper extent of the respective opening downwardly through said bottom wall, each said slot having a depth equal to the thickness of said sidewall, and a pilaster joined to the inner surface of said sidewall extending horizontally across at least a substantial portion of the respective slot and extending generally upwardly from said bottom wall to a height less than that of the upper extent of the respective opening, the upper extent of each pilaster being the generally horizontal shoulder for the respective opening;

a detachable tray having a generally horizontal solid base wall and a retaining wall extending generally upwardly from the periphery of said base wall throughout the extent of the periphery of said base wall to thereby form a receptacle capable of containing a liquid, the transverse dimensions of said base wall being susbstantially greater than the corresponding transverse dimensions of said bottom wall of said pot, a plurality of pillars extending generally upwardly from said base wall at locations spaced from the periphery of said base wall, each of said pillars having a hook member extending generally horizontally from the upper extent of the respective pillar toward the central vertical axis of said tray, each of said hook members being spaced a second distance above said base wall, said second distance being at least as great as said first distance, said pillars being spaced from each other in a pattern corresponding to the pattern of the locations of said plurality of openings in said sidewall of said pot so that upon positioning of said pot on said base wall coaxially with said tray said hook members enter said plurality of openings in said sidewall of said pot and engage said shoulders to thereby lock together said pot and said tray.

3. An article of manufacture in accordance with claim 2 further comprising means secured to the upper portion of said sidewall of said pot for supporting said pot in a hanging position.

4. An article of manufacture in accordance with claim 2 wherein said sidewall of said pot extends generally upwardly and outwardly from the periphery of said bottom wall, and wherein said retaining wall of said tray extends generally upwardly and outwardly from the periphery of said base wall.

5. An article of manufacture in accordance with claim 4 wherein each of said bottom wall of said pot and said base wall of said tray has a generally discoidal configuration, and wherein each of said sidewall and said retaining wall has a generally frustoconical configuration.

6. An article of manufacture in accordance with claim 2 further comprising means located about the peripheral margin of said bottom wall for spacing the central portion of said bottom wall from the central portion of said base wall, whereby at least a portion of the central portion of said base wall can be flexed upwardly sufficiently to cant at least one of said pillars outwardly, thereby withdrawing the hook member of said at least one of said pillars from engagement with the respective shoulder.

7. An article of manufacture in accordance with claim 6 wherein each of said pillars is provided with a bracing portion extending upwardly and inwardly from said base wall to an upper portion of the respective pillar so that each pillar is relatively rigid with respect to the contiguous portion of said base wall.

8. An article of manufacture in accordance with claim 2 wherein each pilaster extends horizontally across at least half and less than the full width of the respective slot so that said opening is generally in the shape of an inverted L.

9. An article of manufacture in accordance with claim 8 wherein the width of each hook member is greater than the distance between the free vertical edge of a pilaster and the adjacent vertical edge of the respective slot.

10. An article of manufacture in accordance with claim 9 wherein each of said bottom wall of said pot and said base wall of said tray has a generally discoidal configuration, and wherein each of said sidewall and said retaining wall has a generally frustoconical configuration.

11. An article of manufacture in accordance with claim 10 wherein said plurality of openings are evenly spaced about the circumference of said sidewall.

12. An article of manufacture in accordance with claim 11 wherein said plurality of openings is three of said openings and wherein said plurality of pillars is three of said pillars.

13. An article of manufacture comprising:

a pot having a bottom wall and a sidewall extending generally upwardly and outwardly from the periphery of said bottom wall, said sidewall extending substantially continuously along the periphery of said bottom wall, said sidewall having a plurality of openings therein spaced horizontally from each other, at least a substantial portion of the bottom edge of each of said plurality of openings being defined by a respective generally horizontal shoulder spaced upwardly from said bottom wall by a first distance; each of said plurality of openings in said sidewall being formed by a slot in said sidewall extending from the upper extent of the respective opening downwardly through said bottom wall, each said slot having a depth equal to the thickness of said sidewall, and a pilaster joined to the inner surface of said sidewall extending horizontally across at least a substantial portion of the respective slot and extending generally upwardly from said bottom wall to a height less than that of the upper extent of the respective opening, the upper extent of each pilaster being the generally horizontal shoulder for the respective opening;

a detachable tray having a generally horizontal solid base wall and a retaining wall extending generally upwardly and outwardly from the periphery of said base wall throughout the extent of the periphery of said base wall to thereby form a receptacle capable of containing a liquid, the transverse dimensions of said base wall being substantially greater than the corresponding transverse dimensions of said bottom wall of said pot, a plurality of pillars extending generally upwardly from said base wall at locations spaced from the periphery of said base wall, each of said pillars having a hook member extending generally horizontally from the upper extent of the respective pillar toward the central vertical axis of said tray, each of said hook members being spaced a second distance above said base wall, said second distance being at least as great as said first distance, said pillars being spaced from each other in a pattern corresponding to the pattern of the locations of said plurality of openings in said sidewall of said pot so that upon positioning of said pot on said base wall coaxially with said tray said hook members enter said plurality of openings in said sidewall of said pot and engage said shoulders to thereby lock together said pot and said tray, each of said pillars being provided with a bracing portion extending upwardly and inwardly from said base wall to an upper portion of the respective pillar so that each pillar is relatively rigid with respect to the contiguous portion of said base wall; and means located about the peripheral margin of said bottom wall for spacing the central portion of said bottom wall from the central portion of said base wall, whereby at least a portion of the central portion of said base wall can be flexed upwardly sufficiently to cant at least one of said pillars outwardly, thereby withdrawing the hook member of said at least one of said pillars from engagement with the respective shoulder.

14. An article of manufacture in accordance with claim 3 wherein each pilaster extends horizontally across at least half and less than the full width of the respective slot so that said opening is generally in the shape of an inverted L.

15. An article of manufacture in accordance with claim 14 wherein the width of each hook member is greater than the distance between the free vertical edge of a pilaster and the adjacent vertical edge of the respective slot.

16. An article of manufacture in accordance with claim 15 wherein each of said botton wall of said pot and said base wall of said tray has a generally discoidal configuration, and wherein each of said sidewall and said retaining wall has a generally frustoconical configuration.

17. An article of manufacture in accordance with claim 16 wherein said plurality of openings are evenly spaced about the circumference of said sidewall.

18. An article of manufacture in accordance with claim 17 wherein said plurality of openings is three of said openings and wherein said plurality of pillars is three of said pillars.

19. An article of manufacture in accordance with claim 18 further comprising means secured to the upper portion of said sidewall of said pot for supporting said pot in a hanging position.

20. An article of manufacture in accordance with claim 19 wherein said pot is a single piece injection molded of thermoplastic material and wherein said tray is a single piece injection molded of thermoplastic material.

21. An article of manufacture in accordance with claim 19 wherein each of the bottom surface of each hook member and the top surface of each shoulder is generally planar.

* * * * *